Nov. 18, 1958  B. C. COONS ET AL  2,860,676
CLEANOUT MECHANISM FOR PEELING KNIFE
Original Filed Sept. 21, 1954  2 Sheets-Sheet 1
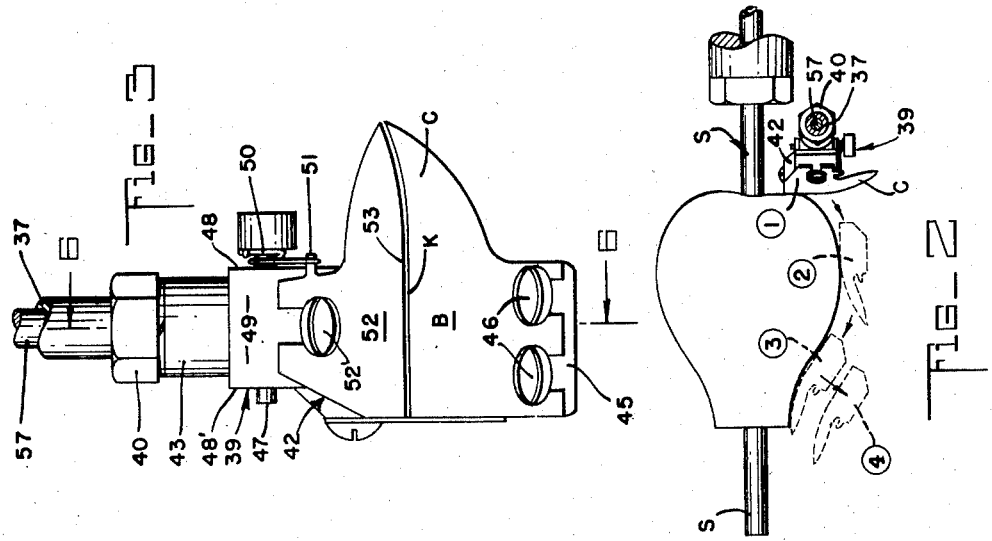
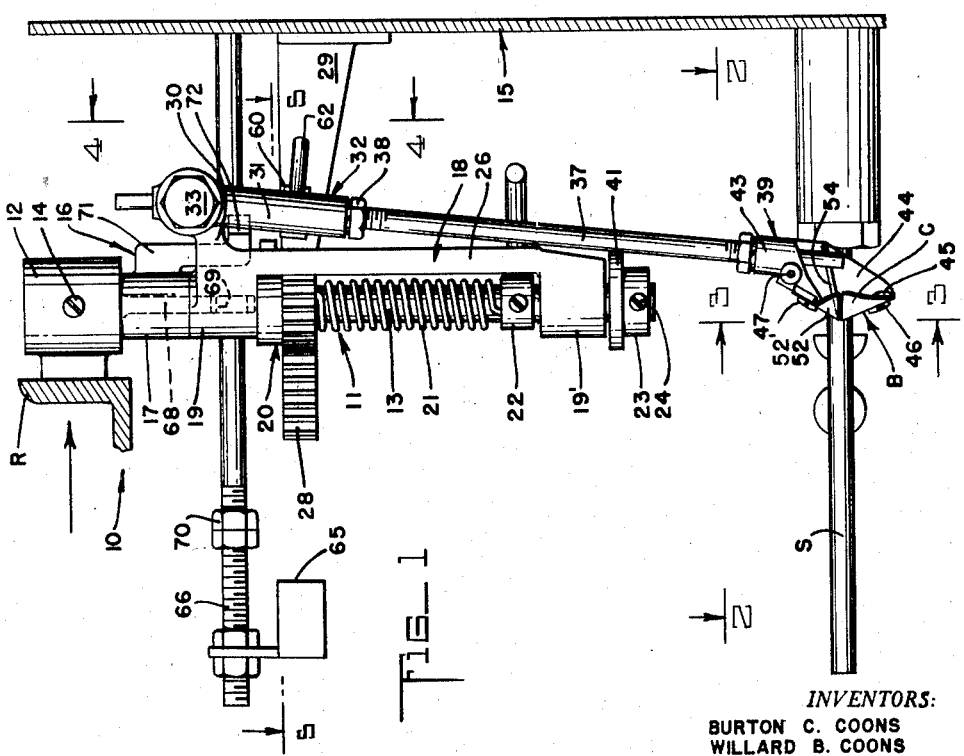
INVENTORS:
BURTON C. COONS
WILLARD B. COONS
BY
*Hansen and Lane*
THEIR ATTORNEYS

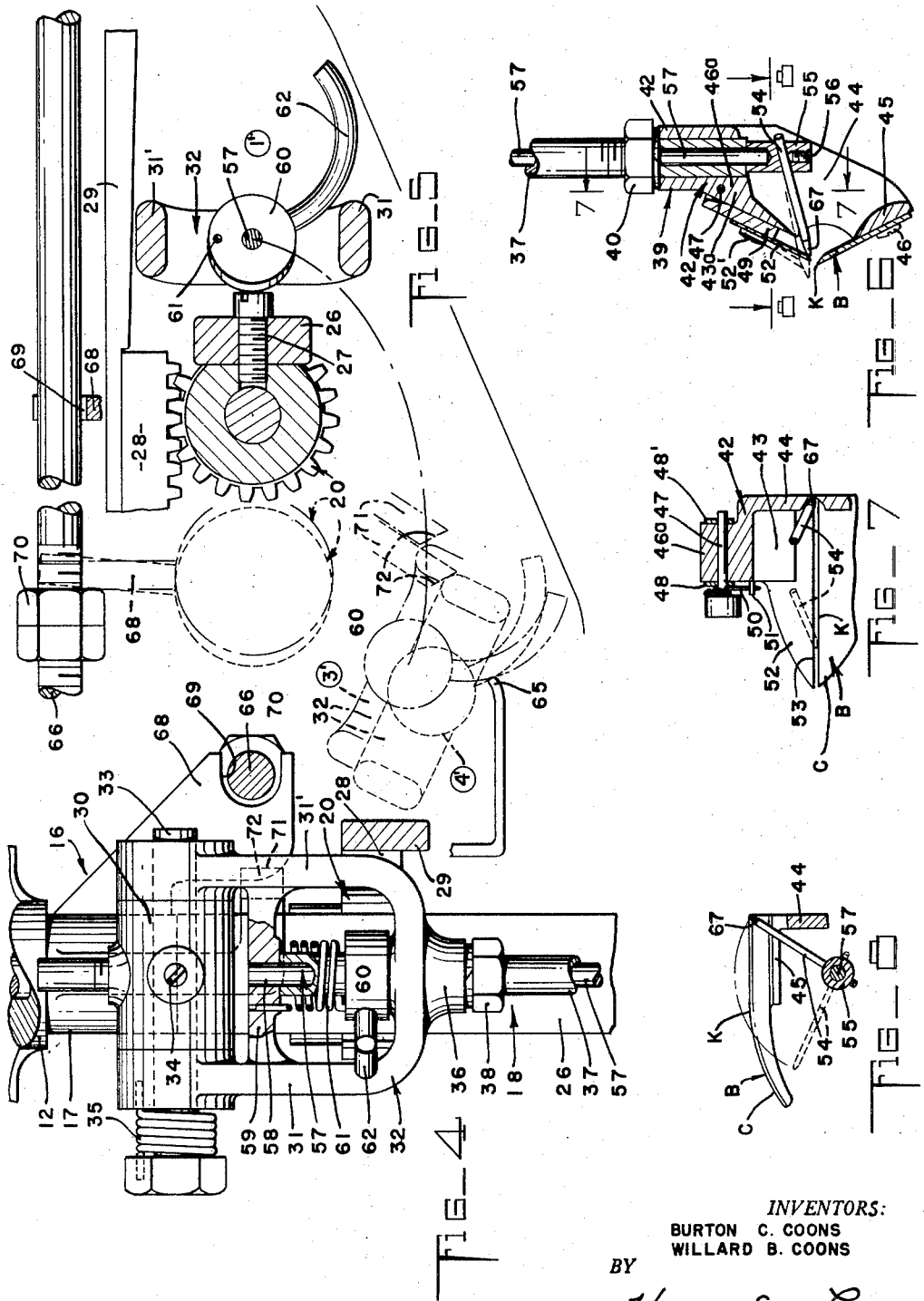

United States Patent Office 2,860,676
Patented Nov. 18, 1958

2,860,676

CLEANOUT MECHANISM FOR PEELING KNIFE

Burton C. Coons, San Jose, and Willard B. Coons, Santa Clara, Calif.

Continuation of application Serial No. 457,359, September 21, 1954. This application October 25, 1955, Serial No. 542,612

14 Claims. (Cl. 146—43)

This invention relates to automatic peeling mechanism in pear peeling apparatus, and more particularly, to a cleanout mechanism therefor.

In the art of peeling fruit, automatically it has long been the practice to mount a relatively rigid blade on a yieldable arm to facilitate the blade following the contour of a fruit while the latter turns with a spindle as the yieldable arm traverses an equatorial path parallel to such spindle for paring the skin layer from the fruit. Oft times, however, the skin of the fruit has been marred during growth by a bruise, by a bird pecking the skin or by some other cause. Such bruises, peck marks, or the like result in the development of a scab, particularly on pears and apples which scabs become woody in character. Because of the gentleness with which the yieldable arm forces the blade against the fruit and the relatively shallow cut at which the blade is set to pare only a thin layer of skin from the fruit, these scabs often get hung upon the cutting edge of the blade although the balance of the pared skin might be torn away from the scab. When this occurs the scab is securely impaled upon the knife blade and forms a nodule thereon which rides the periphery of the spinning fruit and thereby prevents the cutting edge of the blade from paring the skin from the fruit.

It is an object of the present invention to provide a cleanout mechanism in combination with the peeling knife of an automatic peeler.

Another object is to provide a cleanout mechanism in combination with a peeling device which will positively clear the knife blade of substance after each peeling operation.

Another object is to provide a sweep arm in combination with an automatic peeling device for sweeping out or off any skin, scab, or pared material after each peeling operation.

It is another object of this invention to provide in connection with a peeling device coaxial arms, one of which supports a peeling head for moving a peeling blade through an equatorial path and the other adapted for relative turning to effect a sweeping action across the peeling blade.

Another object is to provide in conjunction with a peeling head a gate-like shroud plate overlying the cutting edge of the peeling blade and means for swinging the shroud plate away from the blade once following each peeling operation. In connection with the foregoing, it is an object to provide a stylus arm adapted to sweep over the blade and simultaneously therewith open up the shroud plate to clear skin fragments, scabs, and the like from the blade.

These and other objects and advantages of the present invention will become apparent in the following description when read in the light of the drawings in which:

Fig. 1 is a side view of a peeling device embodying the present invention and shown associated with a fruit turning spindle.

Fig. 2 is a plan view of Fig. 1 taken substantially from line 2—2 in Fig. 1.

Fig. 3 is an enlarged elevation of the peeling head in Fig. 1 as seen from line 3—3 therein.

Fig. 4 is an enlarged fragmentary elevation of a part of the peeling device of Fig. 1 as seen from line 4—4 therein.

Fig. 5 is an enlarged plan view, partially in horizontal section taken substantially along line 5—5 in Fig. 1.

Fig. 6 is a partial vertical section on reduced scale through Fig. 3 taken along line 6—6 therein.

Fig. 7 is a substantially transverse vertical section through Fig. 6 as seen from line 7—7 therein.

Fig. 8 is a plan view of a part of the cleanout device seen from a horizontal cross-section of Fig. 6 taken along line 8—8 thereof.

Referring to Fig. 1, the peeling device 10 includes generally well known and accepted features facilitating the peeling of a fruit. Fig. 1 also shows a fruit turning spindle S upon which a fruit, such as a pear, is adapted to be impaled for turning movement therewith. The main portion of the peeling device 10 comprises a peeling head assembly 11 which includes boss 12 secured to a cross bar R adapted to reciprocate to and from relative to the partition 15 and in a direction parallel to the axis of the fruit turning spindle S. A mounting shaft 13, having its upper end secured by set screw 14 to the boss 12 so as to extend downwardly therefrom for to and fro movement therewith, forms the axis of the peeling device.

A kicker element 16 has a boss portion 17 mounted on the shaft 13 just below the boss 12. Next a knife carriage 18 provided with upper and lower bosses 19 and 19′, respectively, is mounted on the shaft 13. At the same time, a gear 20, a spring 21, and a collar 22 are mounted on the shaft 13 between the bosses 19—19′ of the knife carriage. The lower end of the shaft 13, which is a sufficient distance above the spindle S to clear the largest pear which might be impaled thereon, then receives a cam collar 23 secured by set screw 24 to the shaft 13 so that the knife carriage 18 and kicker element 16 are supported on the depending shaft 13 for turning movement relative thereto. The collar 22 is secured to the shaft 13 and has an arm 25 extending therefrom to engage the backbone or spine 26 of the knife carriage to limit turning movement thereof in one direction relative to the shaft 13.

The spine 26 of the knife carriage 18 is secured by stud screw 27 to a flattened side of the gear 20 to thus maintain the gear 20 in its elevated position on the shaft 13. The collar 22 also forms an anchorage for one end of the spring 21, the opposite end of which is set into the gear 20 for tending to turn the gear 20 and the knife carriage 18 in a direction to engage the spine 26 of the latter against the arm 25, this being the normal or starting position of the knife carriage 18 incident to each peeling operation.

The gear 20 is in mesh with a rack bar 28 fixedly supported in a horizontally extending position adjacent the gear 20 by a bracket 29 secured to the partition 15. In this manner and by this arrangement, as the cross bar R reciprocates from and toward the partition 15, the gear 20 is caused to turn against the action of the spring 21 and thus the knife carriage 18 is turned correspondingly about the axis of the shaft 13 as it reciprocates above the spindle S.

As best seen in Figs. 1 and 4, the knife carriage 18 has a transverse boss 30 extending laterally, i. e., rearwardly, from the spine side of its upper boss 19. The arms 31—31′ of a rocker yoke or bearing member 32 embrace this boss 30 and are rockably supported adjacent thereto by a trunnion pin 33 extending therethrough. The pin 33 is secured to the boss 30 by a set screw 34 and has a head end providing an anchorage for one end of a torsion spring 35, the opposite end of which extends into one arm 31 of the yoke or bearing member 32 for urging the latter toward the spinal back 27 of the knife carriage 18.

At the bight of the yoke 32 a boss 36 is provided through which one end of a sleeve shaft 37 extends. This end of the sleeve shaft 37 is secured to the boss 36 by a lock nut 38 so that the lower end of the sleeve shaft extends downwardly toward the calyx end of a pear impaled upon the spindle S. A knife head 39 is secured by a lock nut 40 to the lower end of the sleeve shaft and this knife head supports a blade B in a position to traverse during reciprocation of the peeler an equatorial path from calyx to stem end of the fruit impaled upon the spindle S for cutting the skin layer therefrom. In this connection, it will be noted that the sleeve shaft 37 engages a cam 41 on the cam collar 23 which holds the knife blade B outwardly against the action of the torsion spring 35 upon the yoke 32 in the absence of a pear or fruit upon the spindle S. However, as soon as a pear becomes fully impaled upon the spindle S the calyx end of such pear bears sufficiently against the blade B to urge the yoke 32 outwardly against the action of the torsion spring 35 and thereby disengages the sleeve shaft 37 from the cam 41. During the entire peeling operation, travel of the blade from calyx to stem end of the fruit, the torsion spring 35 lightly but firmly holds the blade B against the fruit to be peeled.

Having thus described the general characteristics of the peeling device, we will now proceed to a detailed description of the novel improvements therein embodying the invention of this application. It should here be recognized that the sleeve shaft 37 previously mentioned heretofore was merely a solid rod or shaft, so for purposes of this invention we commence with the provision of the sleeve type shaft suspended from the bight of the yoke 32. Moreover, the reference to the knife blade B was for general descriptive purposes only, and so the specific details thereof as well as of the knife head 39 will become more significant in the following description.

The knife head 39 comprises a casting 42 (Fig. 6) having a boss formation 43 which is secured to the lower end of the sleeve shaft 37, preferably by being sweat or shrunk fit onto the same. This casting 42 has a downwardly extending, outwardly tending offset portion 43a which is set in a direction of the pear or rather the direction of movement of the head 39 and shaft 37 by the torsion spring 35. Now on that side of the casting 42 which would be below the arm 25, by which turning movement of the knife carriage 18 by spring 21 is limited, or more specifically on the trailing side of the casting 42 relative to its arcuate path upon reciprocation of the peeling device, the casting is provided with a depending bracket 44. From this trailing bracket 44 an arm 45 extends inwardly below the offset portion 43a. This arm 45 has its fore face disposed at an upwardly extending, outwardly tending angle as distinguished from the direction of disposition of the offset portions 43a above. It is on this arm 45 which the blade B of the present invention is secured by a pair of large oval head machine screws 46.

The blade B is of relatively thin knife steel material having a cutting edge K ground from the inside out (Fig. 6) presenting a keen edge in a horizontal plane substantially parallel to the plane in which the spindle S is disposed. It should here be noted that the pear turning with the spindle travels in a clockwise direction relative to the disposition of the blade shown in Fig. 6. In other words, the unpeeled portion of the pear comes from above and down toward the cutting edge K of the blade so that the skin of the fruit glides over the ground bevel on the outer side of the blade B. The blade B and its cutting edge K is relatively straight adjacent its heel end (trailing end) and has a slight outward arcuate curve C from its plane of connection to the arm 45 and on out to the tip of the blade. This curve C is to conform to the inverse curve at the neck end of a pear between the bulb portion and stem end thereof as illustrated in Fig. 2.

The lower extremity of the offset portion 43a, as best shown in Fig. 6, is slightly to the rear of the cutting edge K of the blade B and at a plane above the same. The base of the offset portion 43a at its connection with the boss 42 provides a boss 46a for securing a pin 47 thereto (Figs. 6 and 7). This pin extends through ears 48—48' on a flap gate 49 so that the latter is free to swing about the pin 47. However, a spring 50 having one end anchored to the pin has its opposite end overlying a finger 51 formed as a part of a shroud 52 secured by screw 52' to the flap gate 49. In this manner, the shroud and flap gate are normally maintained in parallelism with the downwardly extending, outwardly tending offset portion 43a of the knife head casting 42.

The shroud 52 has a guide edge 53 paralleling the cutting edge K of the blade B when in normal position relative thereto. This edge 53 of the shroud is set back relative to the cutting edge K and is spaced upwardly therefrom to admit the skin of the fruit between them as the blade B peels the fruit. In this manner, the thin peeled skin which is usually a continuous ribbon is diverted downwardly and outwardly, i. e., away from the fruit being peeled. Thus the continuous ribbon of peeling or skin coming from the pear is prevented from curling back upon the same and entering between the fruit and blade B which would cause the blade B to move away from the fruit against the action of the torsion spring 35.

Very often skin fragments of the fruit skin may collect behind the shroud 52, and as previously mentioned, woody scabs on the skin of the fruit might become impaled upon the cutting edge K of the blade B or between the same and the guide edge 53 of the shroud. Little or nothing can be done during continued peeling of the particular fruit from which such scab or skin fragments come. However, at the end of each peeling operation it is contemplated by this invention to sweep or clean out the gap between the cutting edge K of the blade B and the guide edge 53 of the shroud.

This sweep or cleanout feature comprises a pin or stylus 54 extending radially from a cap 55 and secured thereto by a set screw 56. This cap is suitably secured to the lower end of a shaft or rod 57 journaled for turning movement in the sleeve shaft 37 previously mentioned. The rod 57 extends upwardly through the sleeve shaft 37 (Figs. 3 and 5) and has the extreme end of its upper portion 58 journaled in a cross brace 59 formed integrally with and extending between the arms 31—31' of the yoke 32. Above the bight of the yoke 32 a collar 60 is secured to the rod 57 for turning movement therewith. A torsion spring 61 circumscribes the upper portion 58 of the rod 57 and has one end anchored in the cross brace 59 and its opposite end set into the collar 60 so as to turn the latter and the rod 57 clockwise (Figs. 4 and 5). The collar 60 has a crooked or arcuate arm 62 extending therefrom and rearwardly from between the arms 31—31' of the yoke 32, and this arm 62 normally engages the arm 31 of the yoke 32 so as to limit turning movement of the collar 60, the rod 57, as well as the stylus 54, under the influence of the torsion spring 61. In this connection, it should be noted that the cap 55 is secured to the lower end of the rod 57 so as to dispose the stylus 54 in a position pointing to the heel of the blade B (see Fig. 8) when the arcuate arm 62 is in engagement with the arm 31 of the yoke 32. This is the normal position of the stylus 54 and arcuate arm 62 when the knife carriage 18 is in its normal or starting position (Fig. 1) between each peeling operation.

Now then upon reciprocation of the cross bar R away from the partition 15, the gear 20 rides the rack bar 28, thus turning the knife carriage 18 so as to maintain the direction of swing of the sleeve shaft 37 by action of the torsion spring 35 substantially radially inwardly relative to the fruit upon the spindle S. Thus, as exemplified in Fig. 2, the knife head 39, while traveling the equatorial path alongside the pear, assumes the positions from 1 to 2 and thence to 3 as designated. This movement of the knife head 39 is gradual and timed to adequately cover the entire area of the turning pear. With the foregoing in mind, refer now to the illustrative plan view in Fig. 5, wherein the yoke 32 is shown in full lines at position 1' as correlated with the full line disclosure of the peeling head 39 at position 1 in Fig. 2. Also note in Fig. 5 that the partial dot-dash disclosure of the yoke at position 3' is correlated with position 3 of the peeling head in Fig. 2. Note also in Fig. 5 that as the yoke 32 approaches position 3, the crooked arm 62 connected to the rod 57 via the collar 60 engages a fixed detent or abutment 65 (see also Fig. 1). The abutment 65 is secured between two nuts on the threaded end of a rod 66 extending from the partition 15 at the desired disposition adjacent the reciprocating knife carriage 18. The rod 57 is thereby turned against the action of the torsion spring 61. In this manner, the stylus 54, which had its pointed tip 67 normally nested in the gap between the cutting edge K of blade B and the guide edge 53 of the shroud 52 at the heel of the blade B, is caused to swing above the cutting edge of the blade B. Since the geometric distance between the heel of the blade B and the axis of the rod 57 is greater than the distance between the latter and the blade B at a plane of swing of the yoke and sleeve shaft about the trunnion pin 33, i. e., radially from the pear, the stylus 54 induces a camming action on the guide edge 53 of the shroud 52 to lift the latter against the action of its spring 35. At the same time, the free end of the stylus sweeps over the cutting edge K, but does not actually scrape or touch the same, to clean out any collection of skin or scap impaled upon the blade.

This sweep of the stylus is just completed about the time that the peeling head reaches position 3 (Fig. 3) which is the very end of the peeling stroke of the knife carriage. At this stage of the peeling operation, the toe end of the blade B is making its final cut at the stem end of the pear. Promptly following completion of the peeling operation, the peeling head 39 is caused to swing outwardly and away from the fruit. This is accomplished by the kicker element 16 previously mentioned as located just above the top boss 19 of the knife carriage 18 and the fixed boss 12 from which the shaft 13 depends.

This kicker element 16, as best seen in Fig. 4, has a radially extending web 68 recessed as at 69 to partially circumscribe the rod 66 previously mentioned. This rod also carries a second abutment 70 in the form of a pair of nuts (Figs. 1, 4, and 5) adapted to be engaged by the web 68 just as the peeling head completes its peeling stroke (position 3). Thus at the final stage of the reciprocation of the cross bar R away from the partition 15, the kicker element 16 is turned several degrees about the shaft 13. The kicker element 16 also has a kicker arm 71 extending therefrom (Figs. 1, 4, and 5) and provided with a toe end 72 normally disposed to engage the arm 31' of the yoke 32. Thus when the kicker element is turned several degrees as aforesaid, the toe end 72 kicks against the yoke 32 to rock the latter outwardly against the action of its torsion spring 35. This moves the yoke slightly from position 3' to position 4' in Fig. 5 and the peeling head 39 at the lower end of the shaft 37 from position 3 to position 4 in Fig. 2.

Immediately following the foregoing operation the completely peeled pear is halved by a pair of halving knives (not shown) so that the pear halves will fall from the spindle. Thereafter the cross bar R returns toward the partition 15 and the peeling device again assumes its normal position.

Having thus described the salient features of our new cleanout for fruit peeling knives of an automatic peeler, it will be apparent that the same may be susceptible to certain modifications, alterations and/or variations without departing from the spirit of our invention. We therefore desire to avail ourselves of all modifications, alterations and/or variations as may fairly come within the purview of the appended claims.

This application is a continuation of our application Serial No. 457,359, filed September 21, 1954, now abandoned, for "Cleanout Mechanism for Peeling Knife."

What we claim as new and desire to protect by Letters Patent is:

1. In an automatic peeling device of the type suspended upon a mounting shaft reciprocable to and fro lengthwise of an adjacent to a fruit supporting spindle, including a knife carriage mounted on said shaft having a gear segment engaging a relatively stationary rack for turning said carriage about said shaft during reciprocation of the latter, and a bearing member supported on said carriage for swinging movement radially relative to said mounting shaft: the combination therewith of coaxial shafts journaled in and suspended from said bearing member, a peeling head at the lower end of one of said coaxial shafts, an arcuate knife blade on said peeling head having a cutting edge disposed in a horizontal plane substantially coincident to the plane in which said spindle is disposed, for engaging the skin and peeling the same from the fruit as it turns with said spindle, and a stylus arm extending radially from the other one of said coaxial shafts adjacent said knife blade for swinging movement over the cutting edge of said knife blade.

2. In an automatic peeling device of the type including a mounting shaft reciprocable to and fro lengthwise of and adjacent to a fruit supporting spindle, a knife carriage mounted on said shaft provided with a gear engaging a relatively stationary rack for turning said carriage about said shaft during reciprocation of the latter, and a bearing member supported on said carriage for swinging movement radially relative to said mounting shaft: the combination therewith of coaxial shafts journaled in and suspended from said bearing member, a peeling head at the lower end of the outer one of said coaxial shafts, an arcuate knife blade on said peeling head having a cutting edge disposed in a horizontal plane substantially coincident to the plane in which said spindle is disposed for peeling the skin from the fruit as it turns with said spindle, a stylus extending radially from the inner one of said coaxial shafts for swinging movement over the cutting edge of said knife blade, yieldable means between the inner one of said shafts and said bearing member for biasing said stylus toward the heel end of said blade, an arm extending radially from said inner one of said coaxial shafts and engaging for engagement with said bearing member for limiting the movement of said inner one of said shafts in response to said yieldable means, and a fixed abutment disposed in the path of movement of said arm for obstructing movement thereof with said reciprocable mounting shaft and to turn said inner shaft against the action of said yieldable means.

3. In an automatic peeling device of the type suspended upon a mounting shaft reciprocable to and fro lengthwise of and adjacent to a fruit supporting spindle, including a knife carriage mounted on said shaft, a gear segment on said carriage engaging a relatively stationary rack for turning said carriage about said shaft during reciprocation of the latter, and a bearing member supported on said carriage for swinging movement radially relative to said mounting shaft: the combination therewith of coaxial shafts journaled in and suspended from said bearing member, a peeling head at the lower end of one of said coaxial shafts, a knife blade on said peeling head having a cutting edge disposed in a horizontal plane substantially coincident to the plane in which said spindle is disposed for engaging the skin and peeling the same from the fruit as it turns with said spindle, a stylus arm extending radially from the other one of said coaxial shafts for swinging movement over the cutting edge of said knife blade, yieldable means for urging said stylus arm toward one end of the cutting edge of said knife blade, and means for turning said other one of said coaxial shafts against the action of said yieldable means for swinging said stylus arm toward the other end of the cutting edge of said blade.

4. In an automatic peeling device of the type suspended upon a mounting shaft reciprocable to and fro lengthwise of and adjacent to a fruit supporting spindle, a knife carriage mounted on said shaft for turning relative thereto, a gear segment on said carriage engaging a relatively stationary rack for turning said carriage about said shaft during reciprocation of the latter, a bearing member supported on said carriage for swinging movement radially relative to said mounting shaft: the combination therewith of coaxial shafts journaled in and suspended from said bearing member, a peeling head at the lower end of the outer one of said coaxial shafts, a knife blade on said peeling head having a cutting edge disposed in a horizontal plane substantially coincident to the plane in which said spindle is disposed for traversing an equatorial path along the fruit turning with said spindle for peeling the skin from the fruit as said mounting shaft is moved in one direction of its reciprocation, a stylus extending radially from the other one of said coaxial shafts for swinging movement therewith, a lever connected to said other one of said coaxial shafts, and an abutment engageable by said lever during the final phase of movement of said mounting shaft in said one direction for swinging said stylus across the cutting edge of said knife blade at the end of each peeling operation thereof.

5. In an automatic peeling device of the type suspended upon a mounting shaft reciprocable to and fro lengthwise of and adjacent to a fruit supporting spindle, a knife carriage mounted for turning on said shaft, a gear on said shaft and secured to said carriage, a relatively stationary rack in mesh with said gear for oscillating said carriage relative to said shaft upon reciprocation of the latter, a bearing member having its arms pivotally secured to said carriage for swinging movement radially relative to said mounting shaft: the combination therewith of coaxial shafts journaled in and suspended from said bearing member, a peeling head at the lower end of the outer one of said coaxial shafts, a blade on said peeling head having a cutting edge disposed in a horizontal plane substantially coincident to the plane in which said spindle is disposed for traveling an equatorial path along the fruit impaled thereon for peeling the skin from the fruit as it turns with said spindle, a shroud mounted on said peeling head above said blade and having a guide edge spaced from and rearwardly of the cutting edge of said blade, a stylus extending radially from the other one of said coaxial arms for swinging movement over the cutting edge of said knife blade and under the guide edge of said shroud, a lever on said other one of said coaxial shafts, and a fixed abutment disposed in the path of movement of said lever and engageable thereby upon turning of said carriage and bearing member relative to said mounting shaft during peeling action of said blade for swinging said stylus between the cutting edge of said blade and the guide edge of said shroud to remove fruit fragments, skin and scabs therefrom.

6. In an automatic peeling device of the type suspended upon a mounting shaft reciprocable fore and aft in a direction lengthwise of and adjacent to a fruit turning on a spindle, a knife carriage mounted on said shaft, a gear secured to said carriage, a relatively stationary rack in mesh with said gear for turning said carriage in one direction about said shaft during reciprocation of the latter in a forward direction and for opposite turning of said carriage during the aftward portion of the reciprocation of said mounting shaft, a bearing member pivoted on said carriage for swinging movement radially relative to said mounting shaft: the combination therewith of coaxial shafts suspended from said bearing member, a peeling head at the lower end of the outer one of said coaxial shafts, a knife blade on said peeling head having a cutting edge disposed in a horizontal plane substantially coincident to the plane in which said spindle is disposed for traversing an equatorial path along the fruit impaled thereon during the fore portion of the reciprocation of said mounting shaft for paring the skin from the fruit as it turns with said spindle, a stylus extending radially from the other one of said coaxial arms for swinging movement during turning thereof, yieldable means normally urging said stylus toward one end of the cutting edge of said blade, a lever extending from said shaft, a stationary abutment in the path of movement of said lever and engageable thereby at the final state of movement of said mounting shaft in the fore direction of its reciprocation for effecting swinging movement of said stylus against the action of said yieldable means, over the cutting edge of said knife blade to clear skin fragments, scabs and the like therefrom subsequent to each peeling operation.

7. A fruit peeling device comprising: first and second coaxial shafts; a peeling head mounted on said first shaft; a knife blade fixed to said peeling head and provided with an outwardly extending cutting edge; a stylus fixed to and extending radially from said second shaft, the free end of said stylus being arranged to sweep along said cutting edge; and means for rotating said shafts independently of each other.

8. A fruit peeling device comprising: first and second coaxial shafts; a peeling head mounted on said shaft for rotation therewith; a knife blade fixed to said peeling head and provided with an outwardly extending cutting edge; a shroud pivoted to said peeling head on an axis generally transverse to the axis of said shafts, the outer edge of said shroud being disposed in parallelism with and immediately adjacent to the cutting edge of said knife blade; means for resiliently urging the outer edge of said shroud towards said knife blade; a stylus fixed to said second shaft and extending outwardly in a position to sweep along said cutting edge and under the outer edge of said shroud; and means for effecting relative rotation between said first and second shafts.

9. A fruit peeling device such as described in claim 8, wherein the said outer edge of said shroud is slightly declined relative to the locus of the outer end of said stylus, and wherein the travel of said stylus in one direction in contact with said outer edge serves to slightly elevate said shroud.

10. A fruit peeling device comprising: a rotatable hollow shaft; a peeling head mounted on said hollow shaft for rotation therewith; a peeling blade fixed to said peeling head and provided with a curved cutting edge, said peeling blade being inclined relative to said hollow shaft; a second shaft journaled within said hollow shaft; a blade-cleaning stylus fixed to said second shaft and extending radially therefrom with its free end arranged to sweep along said cutting edge with positive clearance; means for periodically rotating said hollow shaft; and means for periodically rotating said second shaft relative to said first shaft.

11. A fruit peeling device comprising: first and second coaxial shafts; a peeling head mounted on said first shaft; a knife blade fixed to said peeling head and provided with an outwardly extending cutting edge; a shroud pivoted to said peeling head, the outer edge of said shroud being disposed immediately adjacent to and in parallelism with the cutting edge of said knife blade; means for resiliently uring the outer edge of said shroud towards said knife blade; a residue-wiping member movably mounted on said second shaft adjacent to and behind said cutting edge; and means responsive to the movement of said second shaft for moving said wiping member.

12. A peeling device comprising an elongated movable peeling head having a blade adjacent one end, a blade clearing stylus adjacent said blade, mounting means for said stylus operatively associated with said peeling head, a movable support operatively associated with said peeling head for moving said blade in a predetermined path, and abutment means adjacent said peeling head and having coacting engagement with said stylus mounting means to cause said stylus to move across and clear said blade during movement of said peeling head.

13. A peeling device of the character defined in claim 12 wherein a shroud is hinged to said peeling head adjacent said blade, said shroud having an edge paralleling the cutting edge of said blade and disposed in the path of said stylus whereby said shroud edge is moved away from said blade edge in response to the movement of said stylus relative to said blade.

14. A peeling device of the character defined in claim 12 including a stationary frame on which said peeling device is mounted and to which said abutment is affixed.

References Cited in the file of this patent

UNITED STATES PATENTS

| | | |
|---|---|---|
| 589,080 | Greenfield | Aug. 31, 1897 |
| 984,843 | Pease | Feb. 21, 1911 |
| 987,108 | Boutell | Mar. 21, 1911 |
| 2,740,441 | Coons | Apr. 3, 1956 |